(12) United States Patent
Oeuvrard et al.

(10) Patent No.: US 8,641,251 B2
(45) Date of Patent: Feb. 4, 2014

(54) AUTOMOBILE ORNAMENT PANEL INCLUDING AN ANTI-GLARE ICON AREA, AND RELATED AUTOMOBILE

(75) Inventors: Jean-François Oeuvrard, Cergy Pontoise (FR); Godefroy Beau, La Garenne Colombes (FR)

(73) Assignee: Faurecia Interieur Industrie, Nanterre (FR)

( * ) Notice: Subject to any disclaimer, the term of this patent is extended or adjusted under 35 U.S.C. 154(b) by 127 days.

(21) Appl. No.: 13/060,641

(22) PCT Filed: Aug. 11, 2009

(86) PCT No.: PCT/FR2009/051584
§ 371 (c)(1),
(2), (4) Date: Apr. 8, 2011

(87) PCT Pub. No.: WO2010/023392
PCT Pub. Date: Mar. 4, 2010

(65) Prior Publication Data
US 2011/0182081 A1 Jul. 28, 2011

(30) Foreign Application Priority Data
Aug. 29, 2008 (FR) ...................................... 08 55822

(51) Int. Cl.
*F21V 1/00* (2006.01)
(52) U.S. Cl.
USPC ............ 362/509; 362/459; 362/488; 313/112
(58) Field of Classification Search
USPC ............... 362/19, 23, 29, 459, 482, 487–489; 313/110–117
See application file for complete search history.

(56) References Cited

U.S. PATENT DOCUMENTS

| | | | |
|---|---|---|---|
| 4,418,377 A * | 11/1983 | Tamura | 362/19 |
| 2002/0101738 A1 | 8/2002 | Misaras | |
| 2004/0017687 A1 * | 1/2004 | Misaras | 362/489 |
| 2006/0066192 A1 * | 3/2006 | Beeson et al. | 313/112 |
| 2007/0217010 A1 * | 9/2007 | Lippey | 359/493 |

FOREIGN PATENT DOCUMENTS

| | | |
|---|---|---|
| EP | 1495911 A1 | 1/2005 |
| EP | 1839945 A1 | 10/2007 |
| FR | 2824510 A1 | 11/2002 |
| FR | 2872953 A1 | 1/2006 |
| JP | 60250304 A | 12/1985 |

OTHER PUBLICATIONS

International Search Report, dated Nov. 23, 2009, from corresponding PCT application.

* cited by examiner

*Primary Examiner* — Donald Raleigh
(74) *Attorney, Agent, or Firm* — Young & Thompson

(57) ABSTRACT

An automobile panel (10) includes at least one icon area (18), the area being illuminated by a light source (20) placed under the ornament panel, the panel including a flexible translucent skin (12), forming the outer surface (14) of the ornament panel, and a backing layer (16), placed against the translucent skin (12), the layer (16) having at least one translucent area aligned with the icon area (18). The ornament panel includes at least one polarizing filter (32) placed between the light source (20) and the icon area (18) so as to polarize the light illuminating the icon area (18) and to substantially prevent the subsequent reflection thereof.

17 Claims, 2 Drawing Sheets

AUTOMOBILE ORNAMENT PANEL INCLUDING AN ANTI-GLARE ICON AREA, AND RELATED AUTOMOBILE

BACKGROUND OF THE INVENTION

1. Field of the Invention

The present invention relates to an trim panel of the type comprising at least one pictogram area, said area being illuminated by a light source placed under said trim panel, said trim panel including a flexible translucent skin forming the outer surface of the trim panel, and a backing layer placed against the translucent skin, said layer having at least one translucent area opposite the pictogram area.

The invention also relates to an automobile comprising such an trim panel.

2. Description of the Related Art

It is known to provide trim panels of the aforementioned type making it possible to display pictograms directly on the skin of these panels, said pictograms indicating certain functions or certain statuses of the vehicle. Such panels are in particular used as the trim for the dashboard of the automobile, positioned under the vehicle's windshield.

However, the light passing through the trim panel and emerging in the pictogram area is reflected by the windshield, which can cause the pictogram to be "displayed" on the windshield, particularly visible at night. This image of the pictogram on the windshield can be bothersome to the driver, who may be disturbed by the light reflected on the windshield.

To offset this drawback, it is possible to position the pictogram areas in locations of the trim panel where the reflection of the light on the windshield will not cause a bother for the driver. However, this particular arrangement does not eliminate the reflection of the light on the windshield and does not make it possible to choose the location of the pictograms indifferently. However, one seeks to display the pictograms in locations where they will be easily visible and identifiable by the driver.

Another solution to offset this drawback consists of treating the windshield in a particular manner to reduce the reflection of the light on the inner surface thereof. However, such a treatment is particularly costly and complicates making the windshield.

BRIEF SUMMARY OF THE INVENTION

One of the aims of the invention is to offset the aforementioned drawbacks by proposing an trim panel preventing the later reflection of the light passing through it simply and inexpensively.

To that end, the invention relates to an trim panel of the aforementioned type, in which the trim panel comprises at least one polarizing filter positioned between the light source and the pictogram area so as to polarize the light illuminating the pictogram area and substantially prevent its later reflection.

The polarization of the light before it reaches the pictogram area makes it possible to greatly reduce, or even eliminate, the later reflection of that light for example on the vehicle's windshield.

According to other features of the trim panel:
the polarizing filter is a rectilinear polarizing filter;
the backing layer is a layer of foam comprising an opening opposite the light source, the translucent area of the backing layer being formed by a transparent gel element arranged in said opening;
the polarizing filter is positioned between the light source and said gel element;
the gel element is positioned in a bowl-shaped transparent backing element;
the polarizing filter is positioned against the transparent backing element, under it;
the trim panel comprises a mask comprising openings allowing light to pass and areas preventing the passage of the light, said openings defining the shape of the pictogram, said mask being positioned between the light source and the pictogram area; and
the mask is printed on the polarizing filter.

The invention also relates to a motor vehicle comprising a trim panel as described above, said trim panel being applied against a part of the passenger compartment of said vehicle.

According to another feature of the vehicle, the trim panel is positioned under the windshield of said vehicle, the polarizing filter substantially preventing the reflection of the light illuminating the pictogram area against said windshield.

BRIEF DESCRIPTION OF THE DRAWINGS

Other aspects and advantages of the invention will appear upon reading the following description, provided as an example and done in reference to the appended drawings, in which.

DETAILED DESCRIPTION OF THE PREFERRED EMBODIMENTS

In the description, "outer" refers to what is visible from the passenger compartment of the motor vehicle, and "inner" refers to what is not visible. The terms "upper" and "lower" are defined relative to a direction starting from the wall of the passenger compartment and going towards the inside of the passenger compartment.

Figure 1:
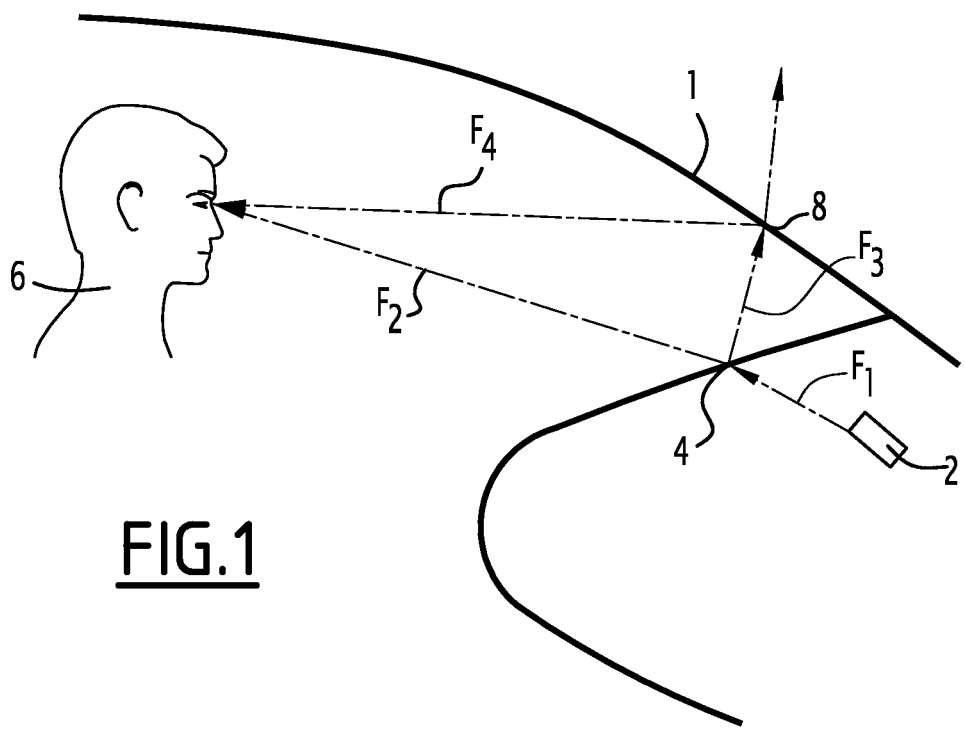
FIG. 1 is a diagrammatic cross-sectional illustration of an trim panel according to the prior art positioned under a windshield.

FIG. 1 shows the path of the light in an trim panel positioned under a windshield 1 when the light emitted by a light source 2 does not undergo any modification and when the windshield is not treated to prevent glare. The light emitted by the light source 2 passes through the trim panel and reaches a pictogram area 4, as indicated by arrow $F_1$. The pictogram area is then illuminated and visible by the driver 6, as shown by arrow $F_2$. However, one component of the light reaches the windshield 1, as shown by arrow $F_3$, and is reflected by it, the area 8 of the windshield where the light reflects then becomes visible by the driver 6, as shown by arrow $F_4$, which can be bothersome for the driver, in particular at night.

Figure 2:
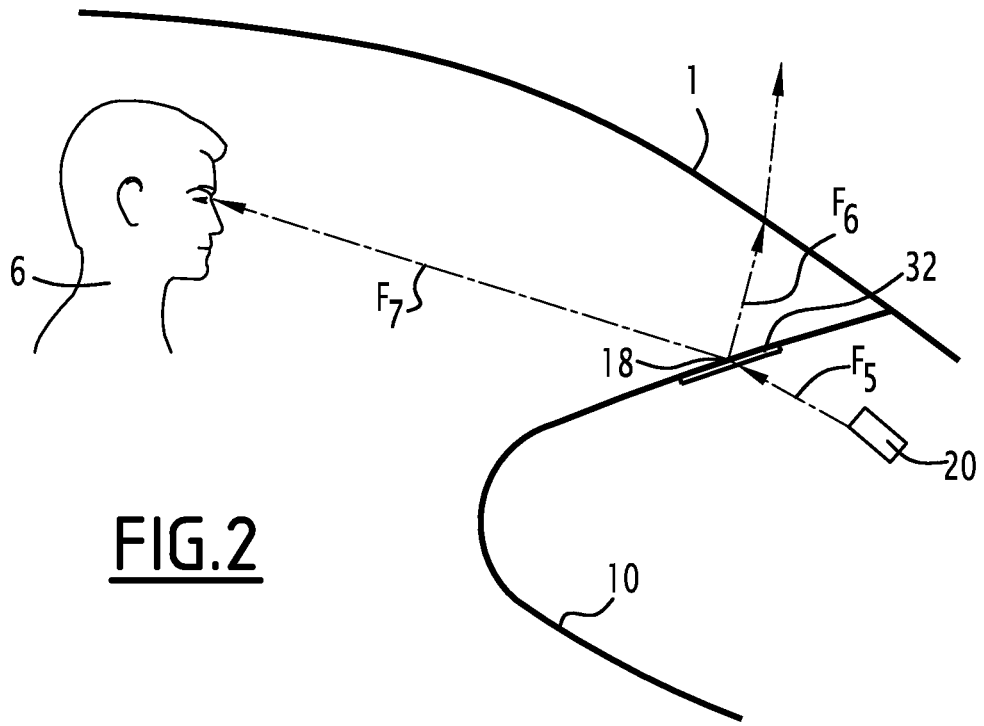
FIG. 2 is a diagrammatic cross-sectional illustration of an trim panel according to the invention positioned under a windshield.
Figure 3:
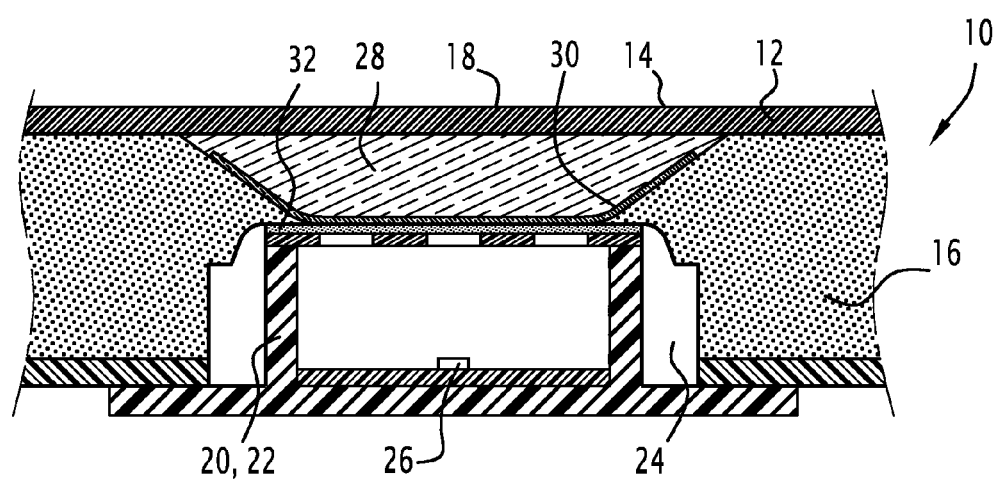
FIG. 3 is a diagrammatic cross-sectional illustration of an trim panel according to the invention showing the arrangement of the pictogram area in detail.

To offset this drawback, the invention provides an trim panel 10 as shown in FIGS. 2 and 3.

The trim panel 10 comprises a translucent flexible skin 12, i.e. allowing light to pass, and a backing layer 16 under and against the translucent skin 12. The skin 12 forms the outer face 14, visible from the passenger compartment of the motor vehicle, of the panel 10. The backing layer 16 is for example made from foam in order to make the trim panel 10 flexible to the touch. This assembly can be configured in the desired manner to adapt to the trim of a motor vehicle. The outer surface 14 formed by the skin 12 is for example substantially planar or has protruding or hollow areas, for example to indicate the presence of buttons for controlling functions of the vehicle under the skin 12/backing layer 16 assembly.

The trim panel 10 comprises at least one pictogram area 18 making it possible to display backlit information on the outer face 14 of the translucent skin 12. To that end, a light source 20 is positioned under the translucent skin 12 opposite the pictogram area 18. This light source 20 is for example a light box 22 arranged in an opening 24 of the backing layer 16. The light box 22 is known in itself and for example comprises a light-emitting diode 26 positioned to emit light towards the pictogram area 18.

The opening 24 is filled with a transparent gel element 28 above the light box 22 so as to allow light to pass between the light box and the pictogram area, as indicated by arrow $F_5$ in FIG. 2. The gel element 28 is for example made from polyurethane or silicone and is arranged not to alter the light that passes through it, i.e. it does not influence the polarization of said light. It is for example cast in a rigid bowl-shaped backing element 30 made from a transparent plastic material. The backing member 30 is also arranged not to alter the light that passes through it. According to another embodiment, the gel element 28 is a gel cushion arranged directly in the opening 24 on the light box 22 and under the skin 12. The upper surface of the gel element 28 is arranged directly against the skin 12.

A polarizing filter 32 is arranged between the upper face of the light box 22 and the gel element 28, under the backing element 30 or directly under the gel cushion. This filter 32 is arranged to polarize the light coming from the light source 20 before it penetrates the gel element 28. The filter 32 is for example a rectilinear polarizing filter. The choice of the polarization depends on the architecture of the motor vehicle and the location where the trim panel of the invention is positioned in the vehicle. For a dashboard, the polarizing filter will for example be a horizontal polarizing filter for a display situated on the dashboard in order to decrease the light intensity that reflects on the windshield following an optical path in the vertical plane. For an trim panel positioned on a door panel, the filter will for example be an oblique polarizing filter. The polarization is defined according to the plane containing the optical path followed by the light ray from the display area to the driver's eye, via a reflection point on a window of the vehicle.

The light passing through the trim panel 10 is thus polarized such that the light oriented towards the windshield 1, as shown by arrow $F_6$ in FIG. 2, is not substantially reflected by it. The pictogram is thus only visible to the driver 6 from the pictogram area 18, as shown by arrow $F_7$ in FIG. 2. Thus the driver 6 is not bothered by the reflection of the pictogram in the windshield 1, in particular at night.

The position of the polarizing filter 32 under the gel 28 makes it possible to preserve the flexible feel of the trim panel 10, but another position of said filter under the flexible skin 12 could be considered.

To define the shape of the pictogram, a mask is provided arranged in the path of the light between the light source 20 and the pictogram area 18, comprising openings allowing light to pass and areas blocking the passage of the light. This mask can be an independent element or be printed on one of the elements of the trim panel. According to one embodiment, the mask is printed on the polarizing filter 32, which enables savings in the production of the trim panel 10.

The trim panel 10 described above makes it possible to greatly reduce the glare of the pictogram on the windshield. The glare is for example reduced by 90%, the remaining 10% being caused by the depolarization of the light when it passes through the translucent skin 12. However, such a reflection is not likely to bother the driver 6. A backlit and anti-glare pictogram area is thus obtained.

Other alternatives of the invention can be considered. For instance, the light box 22 can be overmolded with a translucent foam, which makes it possible to do away with a gel element 28 in the opening 24, the polarizing filter 32 being positioned between the light box 22 and the translucent foam. However, this translucent foam can cause an additional depolarization of the light coming from the light box 22, which can reduce the performance of the trim panel 10 regarding the reflection of the light in the windshield.

The invention claimed is:

1. A trim panel for a motor vehicle, the trim panel comprising:
   at least one pictogram area, said area being illuminated by a light source placed under said trim panel;
   a flexible translucent skin forming an outer surface of the trim panel;
   a backing layer placed against the translucent skin, said backing layer having at least one translucent area opposite the pictogram area; and
   at least one polarizing filter positioned between the light source and the pictogram area, a polarization of the polarizing filter being defined according to a plane containing an optical path followed by a light ray emitted by the light source from a display area to a location corresponding to an eye of an intended user of the vehicle via a reflection point on a window of the vehicle so as to polarize light illuminating the pictogram area and substantially prevent later reflection of the light at the reflection point.

2. The trim panel according to claim 1, wherein the polarizing filter is a rectilinear polarizing filter.

3. The trim panel according to claim 1, wherein the backing layer is a layer of foam comprising an opening opposite the light source, the translucent area of the backing layer being formed by a transparent gel element arranged in said opening.

4. The trim panel according to claim 3, wherein the polarizing filter is positioned between the light source and said gel element.

5. The trim panel according to claim 3, wherein the gel element is positioned in a bowl-shaped transparent backing element.

6. The trim panel according to claim 5, wherein the polarizing filter is positioned against and under the transparent backing element.

7. The trim panel according to claim 1, further comprising a mask comprising openings allowing light to pass and areas preventing the passage of the light, said openings defining the shape of the pictogram, said mask being positioned between the light source and the pictogram area.

8. The trim panel according to claim 7, wherein the mask is printed on the polarizing filter.

9. A motor vehicle comprising the trim panel according to claim 1, said trim panel being applied against part of the passenger compartment of said vehicle.

10. The motor vehicle according to claim 9, wherein the trim panel is positioned under a windshield of said vehicle, the polarizing filter substantially preventing the reflection of the light illuminating the pictogram area against said windshield.

11. The trim panel according to claim 4, wherein the backing layer is a layer of foam comprising an opening opposite the light source, the translucent area of the backing layer being formed by a transparent gel element arranged in said opening.

12. The trim panel according to claim 11, wherein the polarizing filter is positioned between the light source and said gel element.

13. The trim panel according to claim 4, wherein the gel element is positioned in a bowl-shaped transparent backing element.

14. The trim panel according to claim 13, wherein the polarizing filter is positioned against and under the transparent backing element.

15. The trim panel according to claim 1, wherein the window of the vehicle is proximate to the trim panel, and
the light is polarized such that light oriented toward the windshield is prevented from being substantially reflected at the reflection point.

16. An automotive vehicle, comprising:
at least one window; and
a trim panel located opposite the window, the trim panel comprising
at least one pictogram area, said area being illuminated by a light source placed under said trim panel,
a flexible translucent skin forming an outer surface of the trim panel,
a backing layer placed against the translucent skin, said backing layer having at least one translucent area opposite the pictogram area, and
at least one polarizing filter positioned between the light source and the pictogram area, a polarization of the polarizing filter being defined according to a plane containing an optical path followed by a light ray emitted by the light source from a display area to a location corresponding to an eye of an intended user of the vehicle via a reflection point on the window of the vehicle so as to polarize light illuminating the pictogram area and substantially prevent later reflection of the light at the reflection point.

17. The automotive vehicle according to claim 16, wherein the window of the vehicle is proximate to the trim panel, and
the light is polarized such that light oriented toward the windshield is prevented from being substantially reflected at the reflection point.

* * * * *

UNITED STATES PATENT AND TRADEMARK OFFICE
CERTIFICATE OF CORRECTION

PATENT NO.       : 8,641,251 B2  
APPLICATION NO. : 13/060641  
DATED            : February 4, 2014  
INVENTOR(S)      : Oeuvrard et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 168 days.

Signed and Sealed this

Twenty-second Day of September, 2015

Michelle K. Lee
*Director of the United States Patent and Trademark Office*